United States Patent [19]
Gerbehy et al.

[11] Patent Number: 5,212,688
[45] Date of Patent: May 18, 1993

[54] TDM EXPANSION BUS

[75] Inventors: Jay L. Gerbehy, Califon; Richard P. Graber, Westwood; Chester Juall, Hawthorne, all of N.J.

[73] Assignee: Dialogic Corporation, Parsippany, N.J.

[21] Appl. No.: 555,098

[22] Filed: Jul. 18, 1990

[51] Int. Cl.[5] .................................................. H04J 3/06
[52] U.S. Cl. .............................. 370/105.1; 370/85.1; 370/97; 375/111
[58] Field of Search .................... 370/85.1, 58.1, 85.11, 370/85.9, 112, 110.1, 105.1, 100.1, 106, 107, 103, 105.4, 105.5, 97; 375/107, 106, 108–114; 340/825.2, 825.14

[56] References Cited

U.S. PATENT DOCUMENTS

| | | | |
|---|---|---|---|
| 4,679,252 | 7/1987 | Holland | 375/106 |
| 4,768,192 | 8/1988 | Pattavina et al. | 370/105.1 |
| 4,868,812 | 9/1989 | Krüger et al. | 370/85.1 |
| 4,876,683 | 10/1989 | Suzuki | 370/105.1 |
| 4,916,692 | 4/1990 | Clarke et al. | 370/85.1 |
| 4,920,546 | 4/1990 | Iguchi et al. | 375/106 |

OTHER PUBLICATIONS

Mitel Application Note MSAN-126 ST-BUS Generic Device Specification (Rev. A).

*Primary Examiner*—Douglas W. Olms
*Assistant Examiner*—Dang Ton
*Attorney, Agent, or Firm*—Michael B. Einschlag

[57] ABSTRACT

TDM bus and, in particular, a PCM Expansion Bus (PEB): (a) which permits a multiplicity of apparatus to monitor a TDM signal simultaneously and (b) wherein various timing and control signals are provided in a manner that minimizes the hardware needed by the apparatus for identifying, i.e., decoding, various channels in the TDM signal for accessing and inserting information therein.

17 Claims, 16 Drawing Sheets

1. CLKT
2. GND
3. FSYNCT
4. MSYNCT
5. SERT
6.
7. E-CLKT
8. GND
9. E-FSYNCT
10. E-MSYNCT
11. E-TSX*
12. E-SERT
13.
14. CLKR
15. GND
16. FSYNCR
17. MSYNCR
18. SERR
19.
20.
21. GND
22.
23.
24.
25.
26.

FIG. 10C

| PARAMETER | MIN | TYP | MAX |
|---|---|---|---|
| t1- CLKT PERIOD | | 648ns | |
| t2- CLKT HIGH | 259ns | | 388ns |
| t3- CLKT LOW | 259ns | | 388ns |
| t4- CLKT HIGH TO E-CLKT HIGH | 0ns | | 35ns |
| t5- CLKT HIGH TO SERT TRANSITION | 0ns | | 30ns |
| t6- CLKT HIGH TO E-SERT TRANSITION | 0ns | | 30ns |
| t7- CLKT HIGH TO E-TSX* LOW | 0ns | | 100ns |
| t8- CLKT LOW TO E-TSX* HIGH | 0ns | | 100ns |
| t9- CLKT HIGH TO FSYNCT, MSYNCT HIGH | -125ns | | 125ns |
| t10- CLKT HIGH TO FSYNCT, MSYNCT LOW | -125ns | | 125ns |
| t11- CLKT HIGH TO E-FSYNCT, E-MSYNCT HIGH | 0ns | | 100ns |
| t12- CLKT HIGH TO E-FSYNCT, E-MSYNCT LOW | 0ns | | 100ns |
| t13- CLKR PERIOD | | 648ns | |
| t14- CLKR HIGH | 259ns | | 388ns |
| t15- CLKR LOW | 259ns | | 388ns |
| t16- CLKR HIGH TO SERR TRANSITION | 0ns | | 100ns |
| t17- CLKR HIGH TO FSYNCR, MSYNCR HIGH | 0ns | | 125ns |
| t18- CLKR HIGH TO FSYNCR, MSYNCR LOW | 0ns | | 125ns |

TDM EXPANSION BUS

TECHNICAL FIELD OF THE INVENTION

The present invention pertains to method and apparatus for interfacing apparatus, referred to below as network modules and resource modules, which remove data from and inject data into a time-division multiplexed data stream carried on a time-division multiplexed (TDM) data bus and, in particular, a TDM data bus that carries data in a T1 format.

BACKGROUND OF THE INVENTION

In many applications which process signals in a telephone communications environment, there is a need to deal with digital telephone signals in a time-division multiplexed (TDM) data format. As is well known to those of ordinary skill in the art, such signals are comprised of several individual channels, each of which contains information. Further, it is well known that there is a need for apparatus which will receive such a TDM signal and be able to access information in various individual channels and to insert information into the various individual channels. Still further, it is well known that there is a need for such accessing and inserting information to be performed on the same signal by a multiplicity of apparatus.

As is well known to those of ordinary skill in the art, one method and apparatus for accomplishing the above-described multiple access to a data stream is a data bus wherein the data stream is made available to a multiplicity of apparatus for accessing and inserting information in accordance with predetermined bus protocols.

Presently known TDM bus architectures are complicated and the required extraction of TDM timing and control signals from the data streams carried on these buses for identifying the various channels requires substantial and often complex hardware. In light of this, there is a need in the art for a TDM bus: (a) which permits a multiplicity of apparatus to monitor a single TDM signal simultaneously and (b) wherein the various timing and control signals are provided in a manner that minimizes the hardware needed by the apparatus for identifying the various channels for accessing and inserting information therein.

SUMMARY OF THE INVENTION

Embodiments of the present invention advantageously fill the above-identified need in the art by providing a TDM bus and, in particular, a PCM Expansion Bus (PEB): (a) which permits a multiplicity of apparatus (referred to as "resource modules") to monitor a TDM signal simultaneously and (b) wherein the various timing and control signals are provided in a manner that minimizes the hardware needed by the resource modules for identifying, i.e., decoding, various channels in the TDM signal for accessing and inserting information therein (referred to below as "drop/insert").

In accordance with a first aspect of the present invention, a network module is apparatus which provides a full duplex interface between a TDM signal on one hand and a bus, for example, a PCM Expansion Bus (PEB) on the other hand. At the TDM signal input side of the network module, the network module extracts a clock signal, predetermined synchronization and framing signals, and a data signal from the TDM signal and drives the clock signal, the synchronization and framing signals, and the data signal onto the PEB. In addition, a network module receives a clock signal, synchronization and framing signals, and a data signal from the PEB and outputs a TDM signal. Further, a multiplicity of resource modules may interface with the PEB. In particular, a resource module may utilize the synchronization and clock signals to access information in one of the channels of the data signal and/or a resource module may drive a predetermined data signal and a channel indicator signal onto the PEB so as to cause the network module which receives these signals to insert the predetermined data signal into a predetermined channel of the TDM signal. Advantageously, in accordance with the present invention, the amount of hardware needed by the resource modules to access channels in the TDM signal is minimized because synchronization, framing, and clock signals are transmitted over the PEB.

In accordance with a second aspect of the present invention, a network apparatus is apparatus which provides a full duplex interface between a multiplicity of analog signals on one hand and a bus, for example, a PCM Expansion Bus (PEB) on the other hand. The network module receives a clock signal, synchronization and framing signals, and a data signal from the PEB and outputs a multiplicity of analog signals. At the analog signal input side of the network module, the network module takes a clock signal and predetermined synchronization and framing signals from the PEB interface, combines it with a data signal comprised of digitized analog inputs, and applies these signals to the PEB. The interaction of the resource modules with the PEB signals is the same as was described above for the first aspect of the present invention.

BRIEF DESCRIPTION OF THE DRAWING

A complete understanding of the present invention may be gained by considering the following detailed description in conjunction with the accompanying drawing, in which.

DETAILED DESCRIPTION

Figure 1:
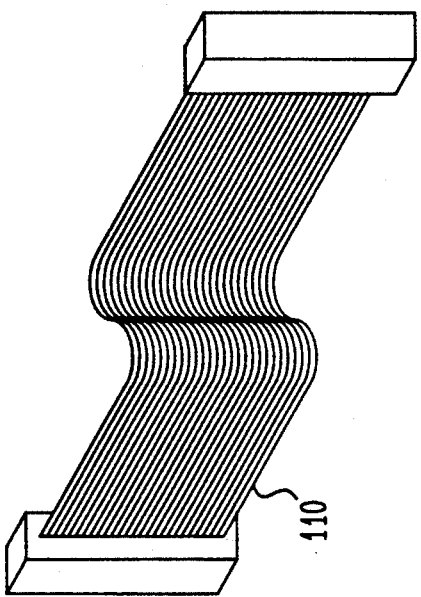
FIG. 1 shows, in pictorial form, a crossover cable for connecting two network modules.

In accordance with one embodiment of the present invention, a network module is apparatus which provides a full duplex interface between a time division multiplexed (TDM) signal comprised of a multiplicity of channels on one hand and a bus, for example, a PCM Expansion Bus (PEB) on the other hand. In this embodiment, the PEB is a high speed, synchronous serial bus for transporting information contained in a digital signal such as, for example, a T1 signal. Of course, those of ordinary skill in the art readily appreciate that PCM refers to a well known encoding format wherein voice analog signals are translated to digital format by taking a sample of the analog voice signal and producing an eight-bit code from the sample. Further, a T1 signal is a digital signal which is used in many telephone environments to time multiplex a multiplicity of voice channels, for example, 24 voice channels, onto a single facility.

At the TDM signal input side of a network module, the network module extracts a clock signal, predetermined synchronization and framing signals, and a data signal from the TDM signal and drives the clock signal, the synchronization and framing signals, and the data signal onto the PEB. In addition, a network module receives a clock signal, synchronization and framing signals, and a data signal from the PEB and outputs a TDM signal. Further, a multiplicity of resource modules may interface with the PEB. In particular, a resource module may utilize the synchronization and clock signals to access information in one of the channels of the data signal and/or a resource module may drive a predetermined data signal and a channel indicator signal onto the PEB so as to cause the network module which receives these signals to insert the predetermined data signal into a predetermined channel of the TDM signal. Advantageously, in accordance with the present invention, the amount of hardware needed by the resource modules to access channels in the TDM signal is minimized because synchronization, framing, and clock signals are transmitted over the PEB.

In order to describe a preferred embodiment of the present invention, the following will describe the manner in which the PEB is used: (a) to extract a 64 Kbps DS0 channel from a T1 signal and terminate the data at a host computer such as, for example, an IBM PC-XT and (b) to insert data from the host computer into the same timeslot in the T1 signal. As one of ordinary skill in the art will readily appreciate, such apparatus permits one to record and playback PCM voice data or to perform message handling of a 56 Kbps or a 64 Kbps data channel.

In general, in accordance with the present invention, the T1 signal is applied as input to a network module. The network module may be thought of as a bus master and, as such, it extracts predetermined synchronization and framing signals, a clock signal, and a logical data signal from the T1 input and drives them onto the PEB. In general, a PEB interfaces with: (a) a further network module — in which case, the second network outputs a T1 signal; and/or (b) a multiplicity of resource modules which: (i) receive the synchronization and framing signals, the clock signal and the data signal from the PEB, (ii) decode and receive information from various ones of the individual channels carried in the data signal, and/or (iii) insert information onto the PEB for transmission to a network module for inclusion into the output T1 signal.

In accordance with the preferred embodiment of the present invention, the PEB comprises a 26-signal ribbon cable and all the signals transmitted over the cable are digital logic signals. The wires of the PEB may also be referred to pathways. In accordance with the preferred embodiment, the PEB is driven by open collector drivers, for example, a 24 mA open collector driver, and a signal is asserted by a logical low. In accordance with the present invention, there are five (5) categories of signals which are carried on the PEB: (a) serial data signals; (b) synchronization and framing signals; (c) grounding signals (d) clock signals; and (e) channel, i.e., timeslot, selection signals. As was indicated above, there are two basic types of apparatus which utilize the PEB: (a) network modules which interface with a TDM signal and (b) resource modules which receive and/or insert data into the T1 signal in predetermined channels or timeslots. Although a multiplicity of resource modules can interface with the PEB to receive data simultaneously, only one of the multiplicity of resource modules can transmit at a time, i.e., insert data into the TDM data signal.

Figure 2:
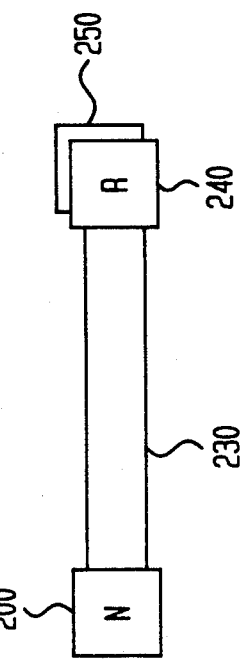
FIG. 2 shows, in pictorial form, a configuration wherein two network modules are interconnected by means of the crossover cable shown in FIG. 1.

The interface configurations between the PEB and the network and resource modules are characterized as follows. First, there is an interconnection configuration wherein a network module is connected to a PEB and the PEB is connected, in turn, to a further network module. This interconnection configuration requires a cable like crossover cable 100 shown in FIG. 1. As will be explained in detail below, crossover cable 100 divides the signals into two groups of signals which are cross connected. FIG. 2 shows a configuration wherein network module 200 is connected to one end of crossover cable 210 and network module 220 is connected to the other end of crossover cable 210.

Figure 3:
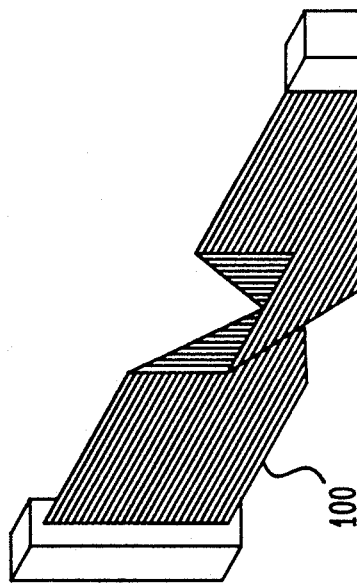
FIG. 3 shows, in pictorial form, a straight cable for connecting a network module and a resource module.
Figure 4:
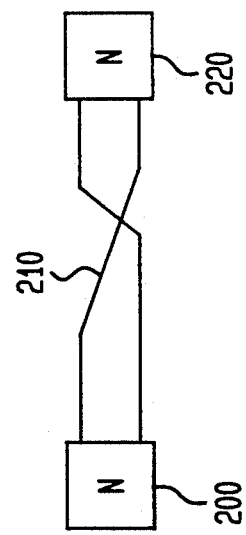
FIG. 4 shows, in pictorial form, a configuration wherein a network module is connected to two resource modules by means of the straight cable shown in FIG. 3.

Second, there is an interconnection configuration wherein a network module is connected to a PEB and the PEB is connected, in turn, to a resource module. This interconnection configuration utilizes a cable like straight cable 110 shown in FIG. 3. FIG. 4 shows an interconnection configuration wherein network module 200 is connected to one end of straight cable 230 and resource modules 240 and 250 are connected to the other end of straight cable 230.

Figures 5, 6:
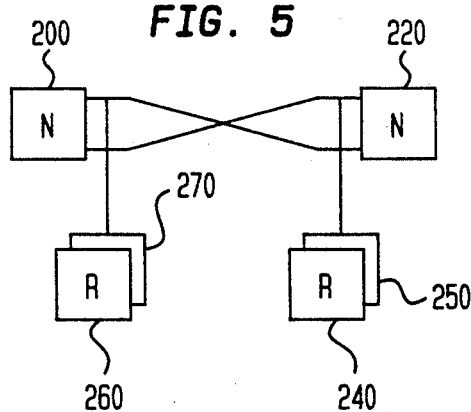
FIG. 5 shows, in pictorial form, a configuration wherein a network module and two resource modules are connected to each end of the crossover cable shown in FIG. 1.
FIG. 6 shows, in pictorial form, the signals which are carried on the preferred embodiment of the PCM Expansion Bus.

Finally, there is an interconnection configuration wherein: (a) a network module is connected to a PEB and the PEB is connected, in turn, to a further network module and (b) one or more resource modules are connected at one or both ends of the ribbon cable endpoints. Here, as in the first interconnection configuration, a crossover cable is utilized. FIG. 5 shows an interconnection configuration wherein network module 200 and resource modules 260 and 270 are connected to one end of crossover cable 210 and network module 220 and resource modules 240 and 250 are connected to the other end of crossover cable 210. In the interconnection configurations described above, the multiplicity of resource modules is optional as well as the use of resource modules at either end of cable 210 in FIG. 5.

FIG. 6 shows, in pictorial form, the signals which are carried by the preferred embodiment of the PEB. In the following, the terms inbound and outbound are defined with respect to a PEB connector, i.e., information which travels from a module into the connector for transport outward over the PEB is referred to as outbound whereas information which travels into a module from a connector after transport inward from the PEB is referred to as inbound.

As shown in FIG. 6, CLKT is a signal which is carried over wire 1 inbound into a network module, this signal is not utilized by resource modules. For T1 data, CLKT is a 1.544 MHz clock which defines the bit cell boundaries of inbound data to the network module. This clock is extracted from a TDM signal by a far-end network module and is driven as CLKR outbound on wire 14.

As shown in FIG. 6, GND is a ground provided by a network module on wire 2.

As shown in FIG. 6, FSYNCT is a signal which is carried over wire 3 inbound into a network module, this signal is not utilized by resource modules. FSYNCT is a frame synchronization signal for inbound data to the network module. For T1 data, FSYNCT is high during the F bit, i.e., the framing bit for T1. This frame synchronization is extracted from a TDM signal by a far-end network module and is driven as FSYNCR outbound on wire 16.

As shown in FIG. 6, MSYNCT is a signal which is carried over wire 4 inbound into a network module, this signal is not utilized by resource modules. MSYNCT is a multi-frame synchronization signal for inbound data to the network module. For T1 data, MSYNCT is high during the F bit at multiframe boundaries. This multiframe synchronization is extracted from a TDM signal by a far-end network module and is driven as MSYNCR outbound on wire 17.

As shown in FIG. 6, SERT is a signal which is carried over wire 5 inbound to a network module, this signal is not utilized by resource modules. For T1 data, SERT contains inbound data bits in the T1 signal in logical data format. This data signal is extracted from a TDM signal by a far-end module and is driven as SERR outbound on wire 18.

As shown in FIG. 6, E-CLKT is a signal which is carried over wire 7 outbound from a network module for input to a resource module. For T1 data, E-CLKT is a 1.544 MHz clock which is extracted from the T1 signal by the network module and defines the bit cell boundaries of resource module data, signaling and interlink information.

As shown in FIG. 6, GND is a ground provided by a network module on wire 8.

As shown in FIG. 6, E-FSYNCT is a signal which is carried over wire 9 and which is outbound from a network module and input to a resource module. E-FSYNCT is a frame synchronization signal for resource module data, signaling and interlink information that is bound for a network module. For T1 data, E-FSYNCT is high during the F bit.

As shown in FIG. 6, E-MSYNCT is a signal which is carried over wire 10 and which is outbound from a network module and input to a resource module. E-MSYNCT is a multiframe synchronization signal for resource module data, signaling and interlink information that is bound for a network module. For T1 data, E-MSYNCT is high during the F bit at multiframe boundaries.

As shown in FIG. 6, E-TSX* is a signal which is carried over wire 11 and which is output from a resource module and input to a network module. E-TSX* is a channel or timeslot select signal which is used as follows. When E-TSX* is low, it indicates that E-SERT contains valid information. In a preferred embodiment of the present invention, E-TSX* is an open collector signal. Thus, when more than one resource module interfaces the end of the PEB, their E-TSX* signals are wire-or'd together.

As shown in FIG. 6, E-SERT is a signal which is carried over wire 12 inbound into a network module and outbound from a resource module. E-SERT contains data which is transmitted by a resource module to a network module and, in the preferred embodiment of the present invention, E-SERT is an open collector signal. E-SERT is ignored by the network module except when E-TSX* is low. When more than one resource module are connected at an end of the PEB, their E-SERT signals are wired-or'd together.

As shown in FIG. 6, CLKR is a signal which is carried over wire 14 and is a clock which is output by a network module and input by a resource module or a far-end network module. For T1, CLKR is a 1.544 MHz clock that defines bit cell boundaries of outbound data from a network module and inbound data to a resource module.

As shown in FIG. 6, GND is a ground provided by a resource module on wire 15.

As shown in FIG. 6, FSYNCR is a signal which is carried over wire 16 and which is output from a network module and input to a resource module. FSYNCR is a frame synchronization signal for inbound data, signaling, and interlink information on resource modules. For T1, FSYNCR is held low whenever synchronization is lost at the T1 interface network module.

As shown in FIG. 6, MSYNCR is a signal which is carried over wire 17 and which is output from a network module and input to a resource module. MSYNCR is a multiframe synchronization signal for inbound data, signaling, and interlink information on resource modules. For T1, MSYNCR is held low whenever synchronization is lost at the T1 interface network module.

As shown in FIG. 6, SERR is a signal which is carried over wire 18 and which is outbound from a network module and input to a resource module, i.e., SERR is outbound serial data from a network module and inbound serial data on a resource module.

As shown in FIG. 6, GND is a ground provided by a resource module on wire 21.

Figure 7:
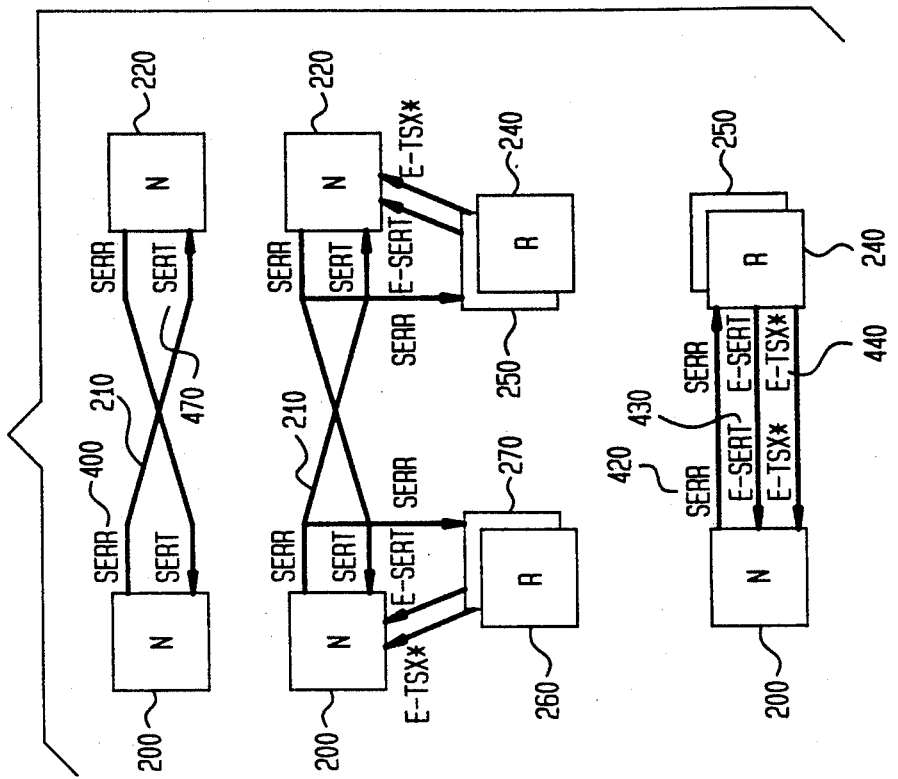
FIG. 7 shows, in pictorial form, clock signal interconnections for the PCM Expansion Bus in various possible interconnection configurations.

FIG. 7 shows the clock signal interconnections for the PEB in the various possible interconnection configurations discussed above. For example, in the network module to network module interconnection of FIG. 2, as shown in FIG. 7, CLKR signal 300 output by network module 200 is driven through crossover cable 210 to CLKT signal 310 of network module 220. Further, in the network-resource module to network-resource module interconnection of FIG. 5, as shown in FIG. 7, network modules 200 and 220 loop CLKT signals 320 and 330, respectively, to E-CLKT 340 and E-CLKT 350, respectively. In addition, resource modules 260 and 270 use CLKR 360 and E-CLKT as their receive and transmit clocks, respectively, and resource modules 240 and 250 use CLKR 370 and E-CLKT 350 as their receive and transmit clocks, respectively. Still further, in the network module to resource module interconnection of FIG. 4, as shown in FIG. 7, network module 200 drives E-CLKT and CLKR to resource modules 240 and 250.

Figure 8:
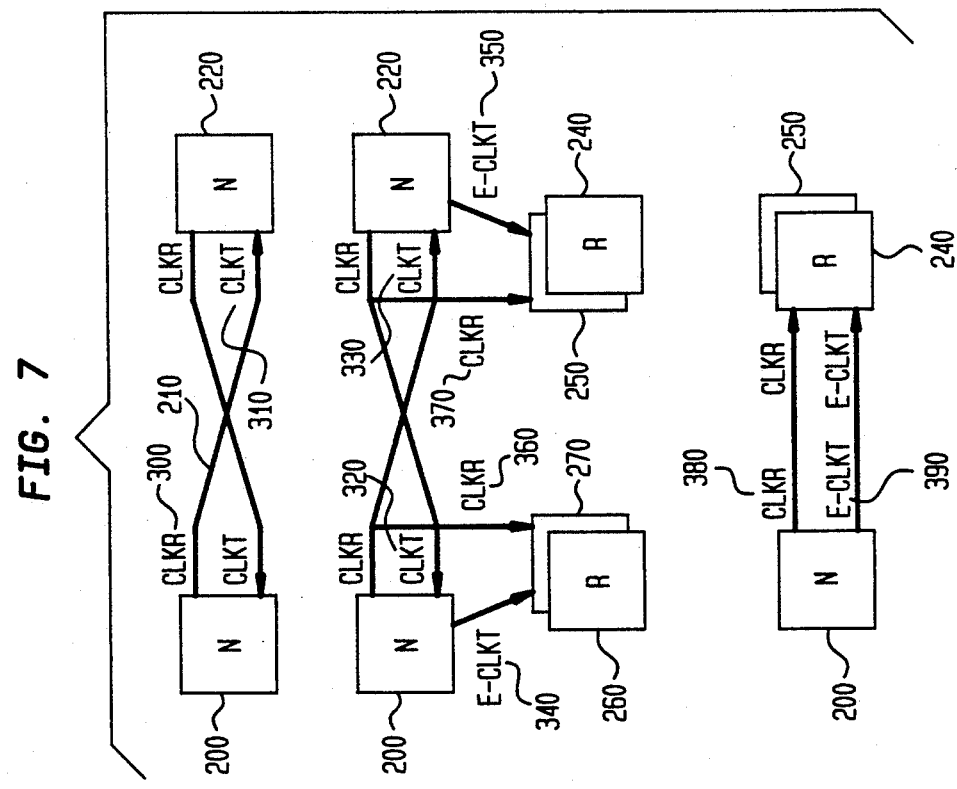
FIG. 8 shows, in pictorial form, data signal interconnections for the PCM Expansion Bus in various possible interconnection configurations.

FIG. 8 shows the data signal interconnections for the PEB in the various possible interconnection configurations discussed above. For example, in the network module to network module interconnection of FIG. 2, as shown in FIG. 8, SERR signal 400 output by network module 200 is driven through crossover cable 210 to SERT signal 310 of network module 220. Further, in the network-resource module to network-resource module interconnection of FIG. 5, as shown in FIG. 8, a network module may receive transmit data either from the other network module or from resource modules that reside on the same end of crossover cable 210. The local E-TSX* signal which is driven from each resource module to its local network module serves to select between these two data sources. When E-TSX* is low, the local network module will accept transmit data from the locally connected resource module. On the other hand, when E-TSX* is high, the local network module will accept transmit data from the network module at the opposite end of the crossover cable. Still further, in the network module to resource module interconnection of FIG. 4, as shown in FIG. 8, data travels from network module 200 to resource modules 240 and 250 via SERR 420 and data travels from resource modules 240 and 250 to network module 200 via E-SERT 430. E-TSX* 440 is driven low by the appropriate one of resource modules 240 and 250 during active timeslots.

Figure 9:
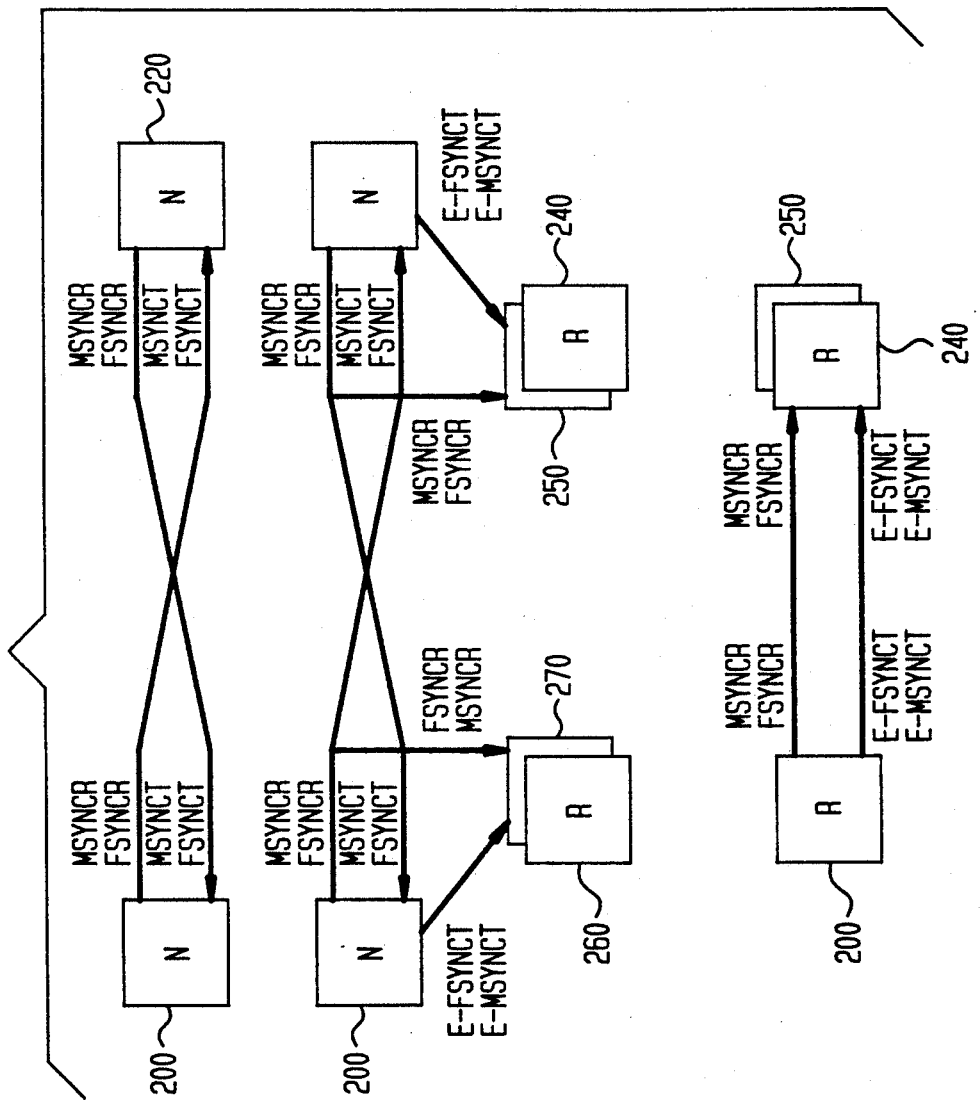
FIG. 9 shows, in pictorial form, synchronization interconnections for the PCM Expansion Bus in various possible interconnection configurations.

FIG. 9 shows the synchronization interconnections for the PEB in the various possible interconnection configurations discussed above. As is well known to those of ordinary skill in the art, synchronization information is required for character and frame boundaries to be extracted from the serial data and signaling streams. For example, in the network module to network module interconnection of FIG. 2, as shown in FIG. 9, FSYNCR and MSYNCR output by network module 200 are driven through crossover cable 210 to FSYNCT and MSYNCT of network module 220, respectively. Further, in the network-resource module to network-resource module interconnection of FIG. 5, as shown in FIG. 9, network modules 200 and 220 loop FSYNCT to E-FSYNCT and MSYNCT to E-MSYNCT, respectively. In addition, the locally connected resource modules use E-FSYNCT and FSYNCR as transmit and receive frame boundary indicators and E-MSYNCT and MSYNCR as transmit and receive multiframe boundary indicators, respectively. Still further, in the network module to resource module interconnection of FIG. 4, as shown in FIG. 9, network module 200 drives E-FSYNCT and FSYNCR to provide transmit and receive frame boundary indicators to resource modules 240 and 250 and network module 200 drives E-MSYNCT and MSYNCR to provide transmit and receive multiframe boundary indicators to resource modules 240 and 250. For T1, FSYNCR and MSYNCR are held low whenever synchronization is lost at the T1 interface network module. Advantageously, this freezing of the sync signals protects against erroneous signaling transitions during loss of synchronization.

Signaling information is transmitted across the PEB as follows. For a T1 signal, signaling information is transmitted using the well known "robbed-bit" format. This means that A signaling bits are present during frame #6, B signaling bits are present during frame #12, and, in the ESF framing mode, the C and D signaling bits are present during frames 18 and 24, respectively. Depending upon the type of T1 framing encountered, PEB may operate with either 12 or 24 frames per superframe, i.e., when D4 framing is encountered, there are 12 frames per superframe and when ESF framing is encountered, there are 24 frames per superframe.

Figure 10A:
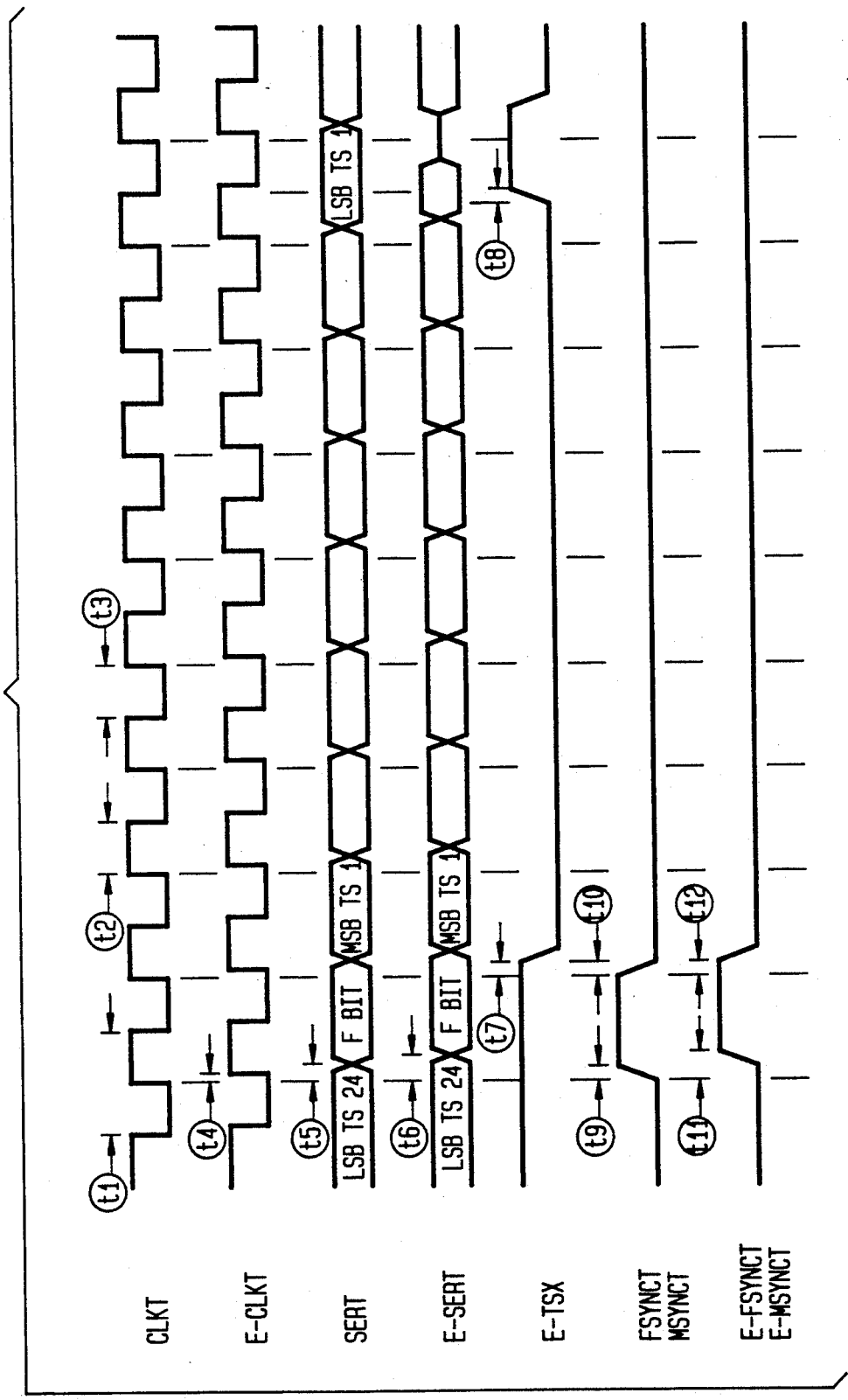
FIGS. 10(A-C) show the timing parameters utilized for a preferred embodiment of the PCM Expansion Bus.
Figure 10B:
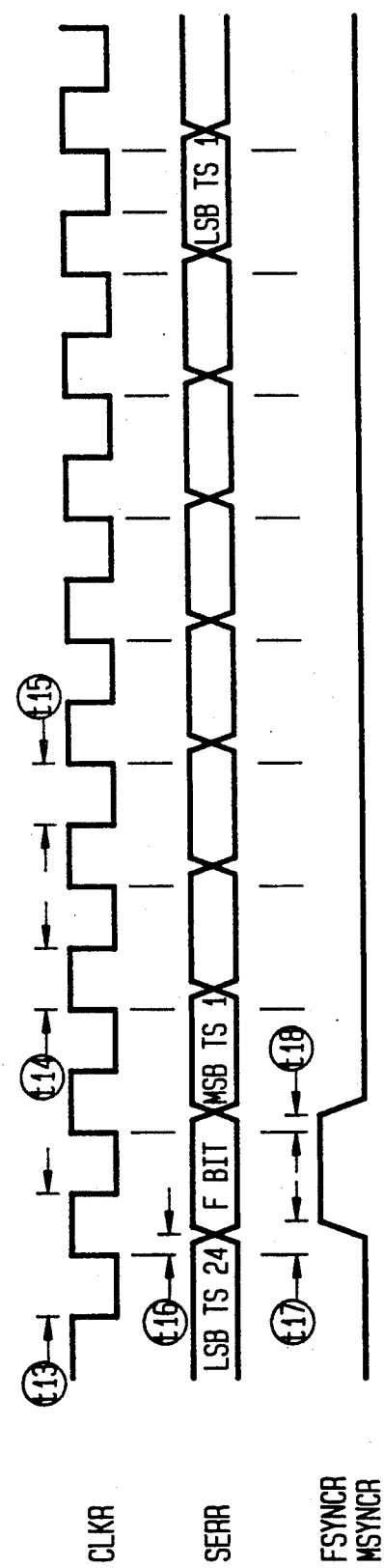

FIGS. 10(A-C) show the timing parameters utilized for a preferred embodiment of the PEB.

Figure 11A:
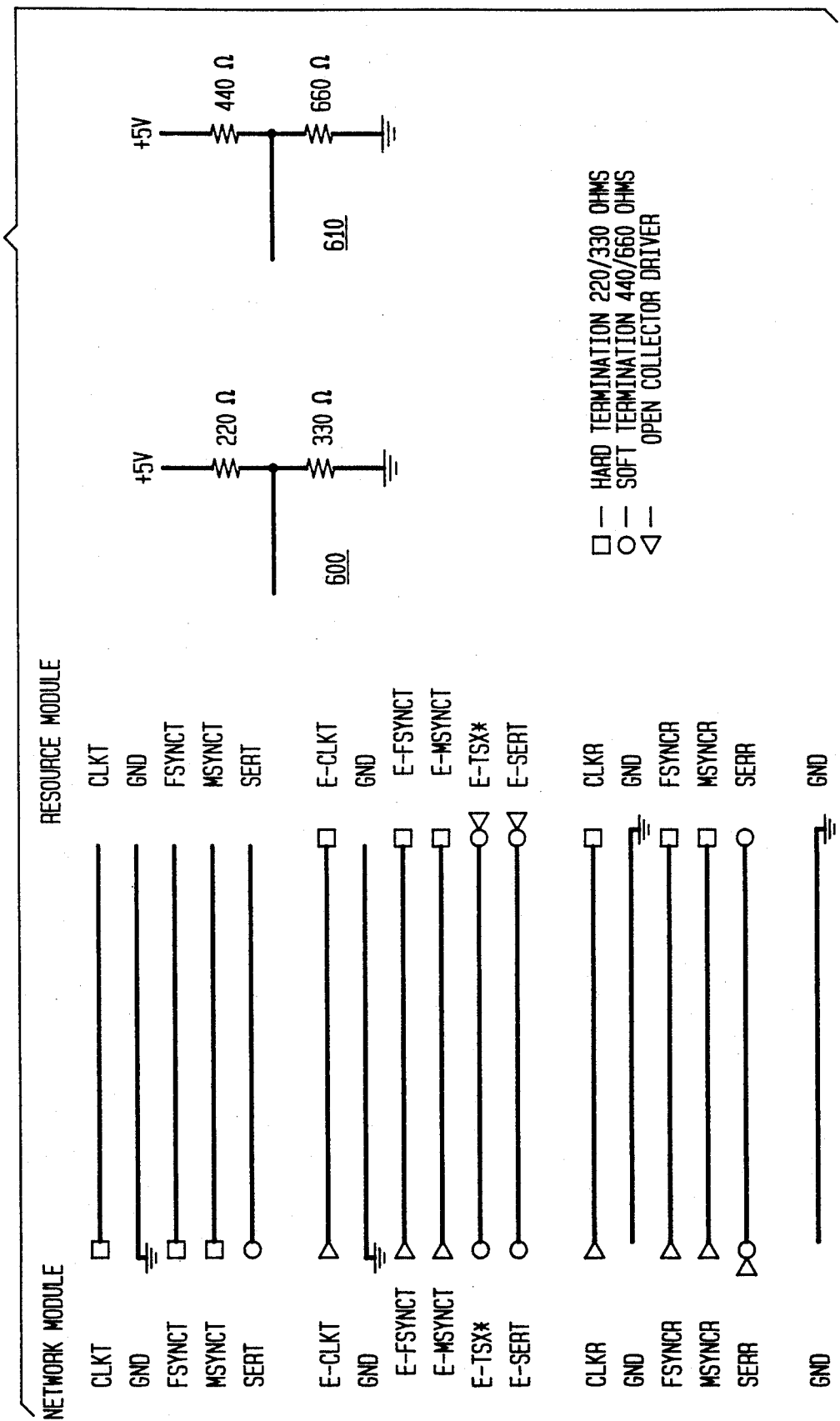
FIG. 11A shows, in pictorial form, a hard termination, a soft termination, and the configuration of PCM Expansion Bus signal drivers and terminations for network and resource modules.

The PEB must be terminated at both ends to prevent reflections of signals. In a preferred embodiment of the present invention, two types of terminators are utilized, referred to as hard and soft terminations, respectively. FIG. 11A shows hard termination 600, soft termination 610, and the configuration of PEB signal drivers and terminations for network and resource modules. In a preferred embodiment of the present invention, the open collector drivers utilized are 24 mA 74LS1035 open collector drivers.

Figure 11B:
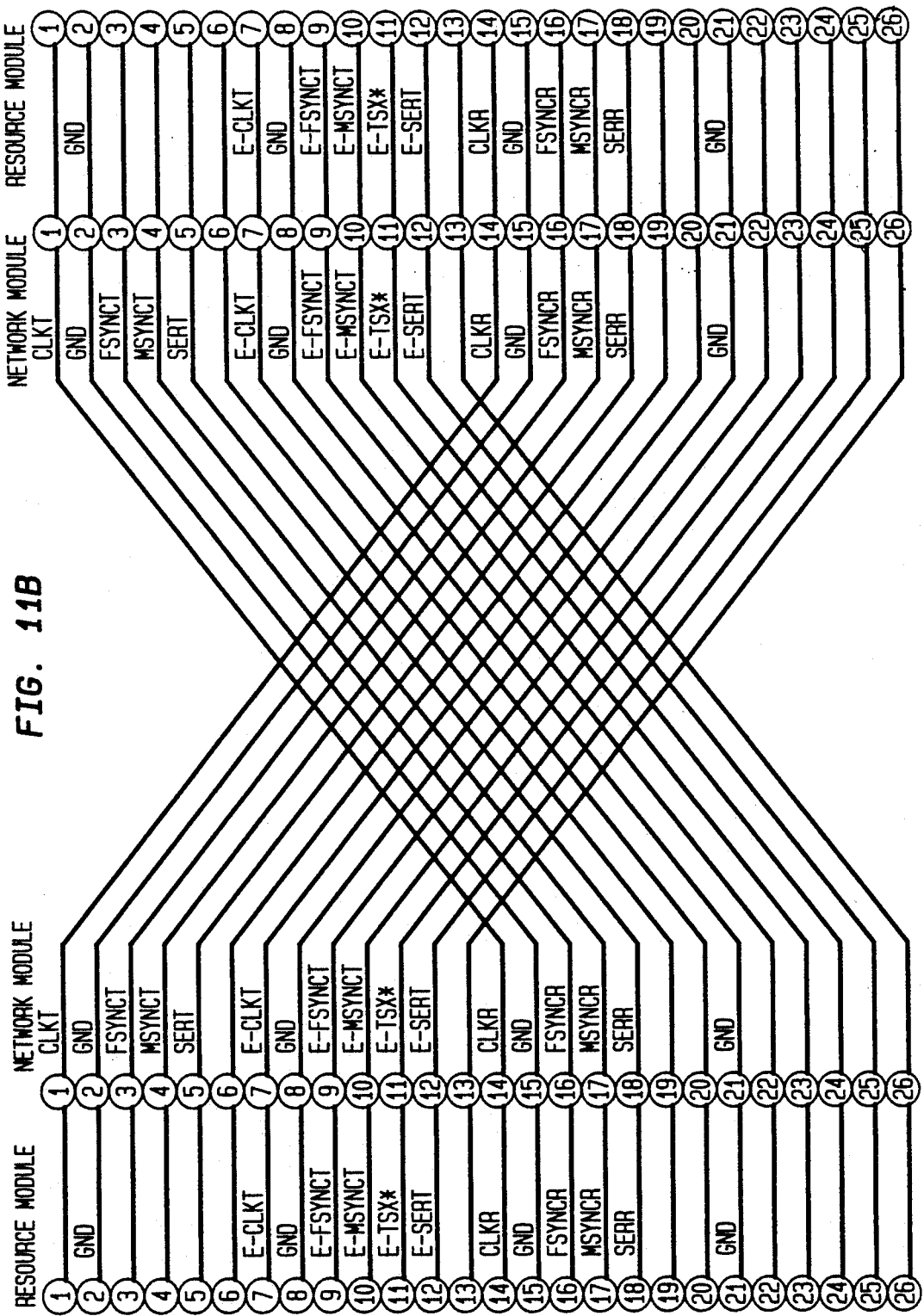
FIG. 11B shows, in pictorial form, signal paths for the various configurations of the PEB.

In summary, FIG. 11B shows the signal paths for the various configurations of the PEB.

Advantageously, the above-described PEB permits a systems designer to easily design modules with interface with the PEB. In the following, a resource module is described which will extract a 64 Kbps DS0 channel from a T1 signal and terminate the data channel at a host, for example, an IBM PC-XT. The resource module will also insert data transmitted by the host into the same channel or timeslot in the transmit direction. As one can readily appreciate, this resource module permits one to record and playback a PCM voice data or to perform message handling of a 56 Kbps or 64 Kbps data channel.

Figure 12:
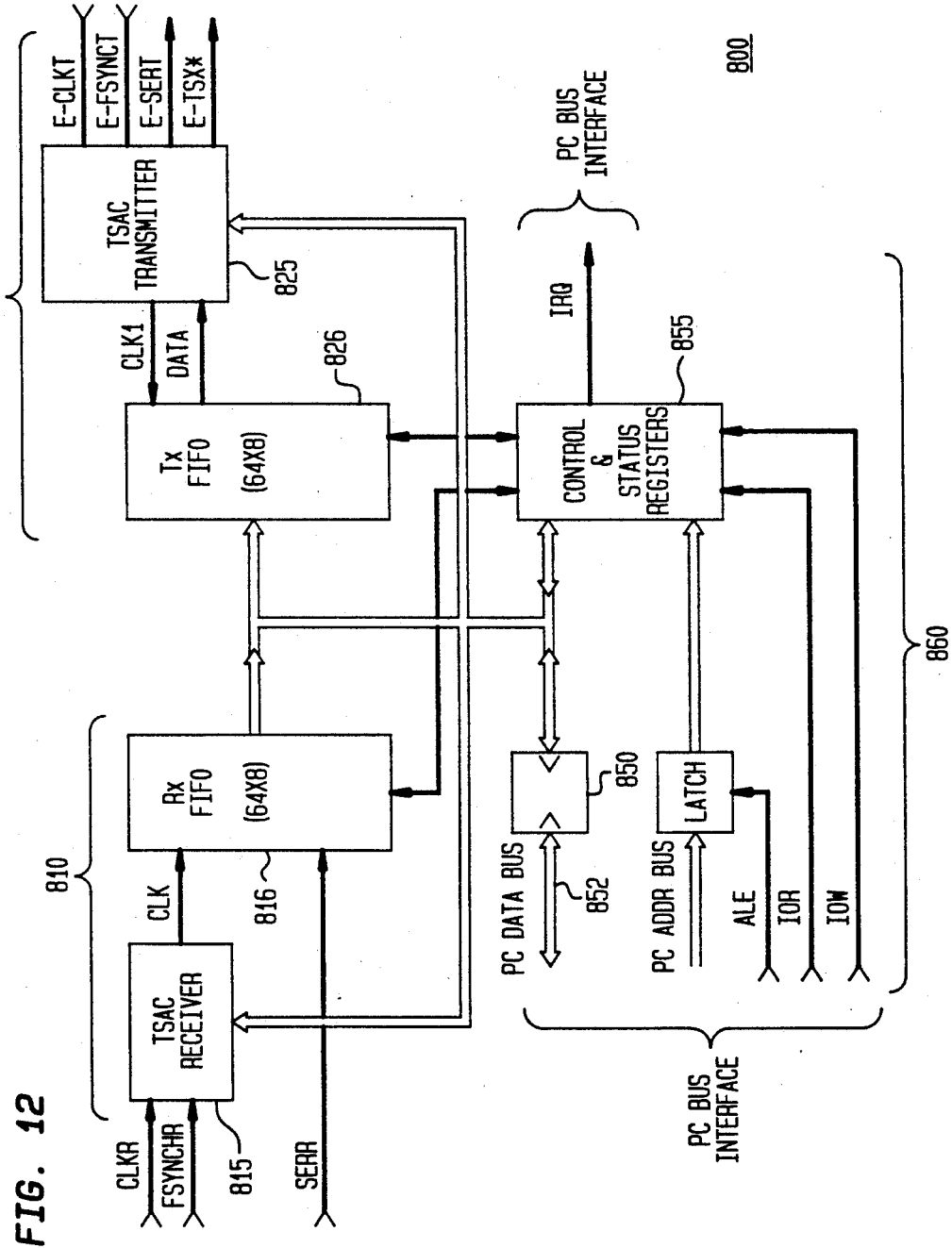
FIG. 12 shows a block diagram of one embodiment of a resource module.

FIG. 12 shows a block diagram of resource module 800. Resource module 800 is comprised of receiver 810, transmitter 820, and host computer bus interface 860. As shown in FIG. 12, receiver 810 is comprised of time-slot assignment circuit (TSAC) 815 and Rx FIFO 816. Signals CLKR and FSYNCR from the PEB are applied as input to TSAC 815 and, in response, TSAC 815 selects a predetermined DS0 timeslot in accordance with programmed input to control/status register 855 from the host computer (not shown). TSAC 815 selects a predetermined DS0 timeslot from the serial data of signal SERR which is applied as input to Rx FIFO 816 by generating 8 clock pulses CLK for the 8 bits in the timeslot. As shown in FIG. 12, CLK clocks serial receive data from signal SERR into Rx FIFO 816. In this embodiment, when Rx FIFO 816 is half full, an interrupt request, signal IRQ, is sent to the host through control/status register 855. In response to interrupt IRQ, the host computer reads half of Rx FIFO 816, 32 bytes in this embodiment, from buffer 850.

As shown in FIG. 12, transmitter 820 is comprised of TSAC transmitter 825 and Tx FIFO 826. In this embodiment, TSAC transmitter 825 operates on the same timeslot that have been assigned to receiver portion 810. Signals E-CLKT and E-FSYNCT from the PEB are applied as input to TSAC 815 and, in response, TSAC 825 generates E-TSX* and 8 clock pulses CLK1 to Tx FIFO 826 to clock out the serial transmit data to signal E-SERT on the PEB. An interrupt is sent to the host computer whenever Tx FIFO 826 is less than half full. In response, the host computer transmits data to fill half of Tx FIFO 826, 32 bytes in this embodiment 32 bytes, into buffer 850.

In this embodiment, resource module 800 is treated as an I/O port by the host computer. For example, in this embodiment, an I/O address ranges from 1 to 7 wherein the least significant I/O address bit is used to select either buffer 850 or control/status register 855. Status bits for overflow and underflow are latched in control/status register 855 and cleared when read. An interrupt level is selectable to any one of 6 IRQ levels and may be disabled and polled in control/status register 855 if desired. In this embodiment, the host computer must first read control/status register 855 whenever an interrupt occurs to determine which circuit — Rx FIFO 816, Tx FIFO 826, or both — has issued the interrupt. The interrupt status bits are not latched and will not be cleared on a read of the status register. Control/status register 855 loads the desired timeslot to TSAC circuits 815 and 825. Control/status register 855 also allows independent resetting of receiver 810 and transmitter 820. This is particularly useful for half-duplex operations to eliminate unwanted interrupts.

Figure 13:
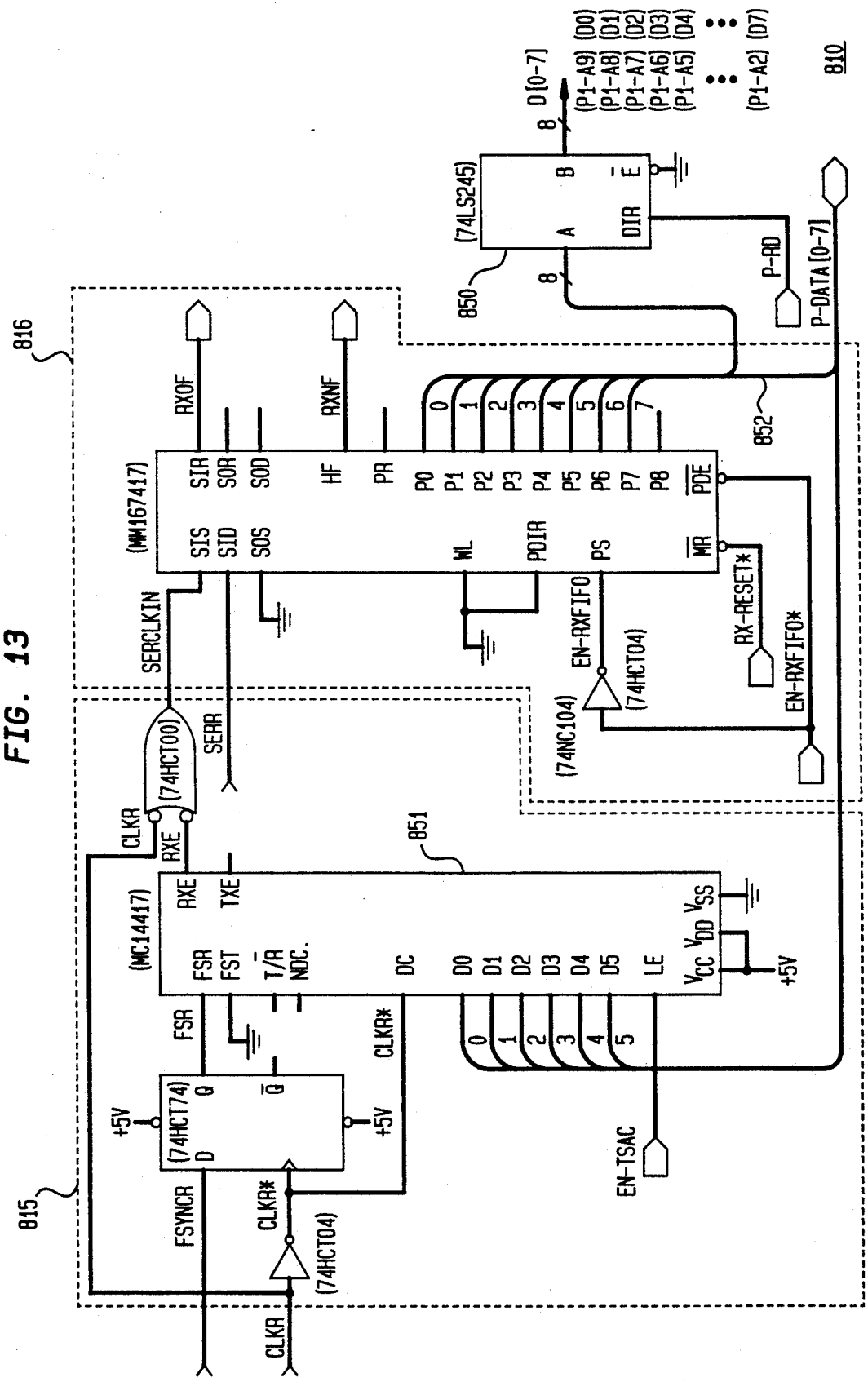
FIG. 13 is a schematic of DS0 receiver 810 shown in FIG. 12.
Figure 14:
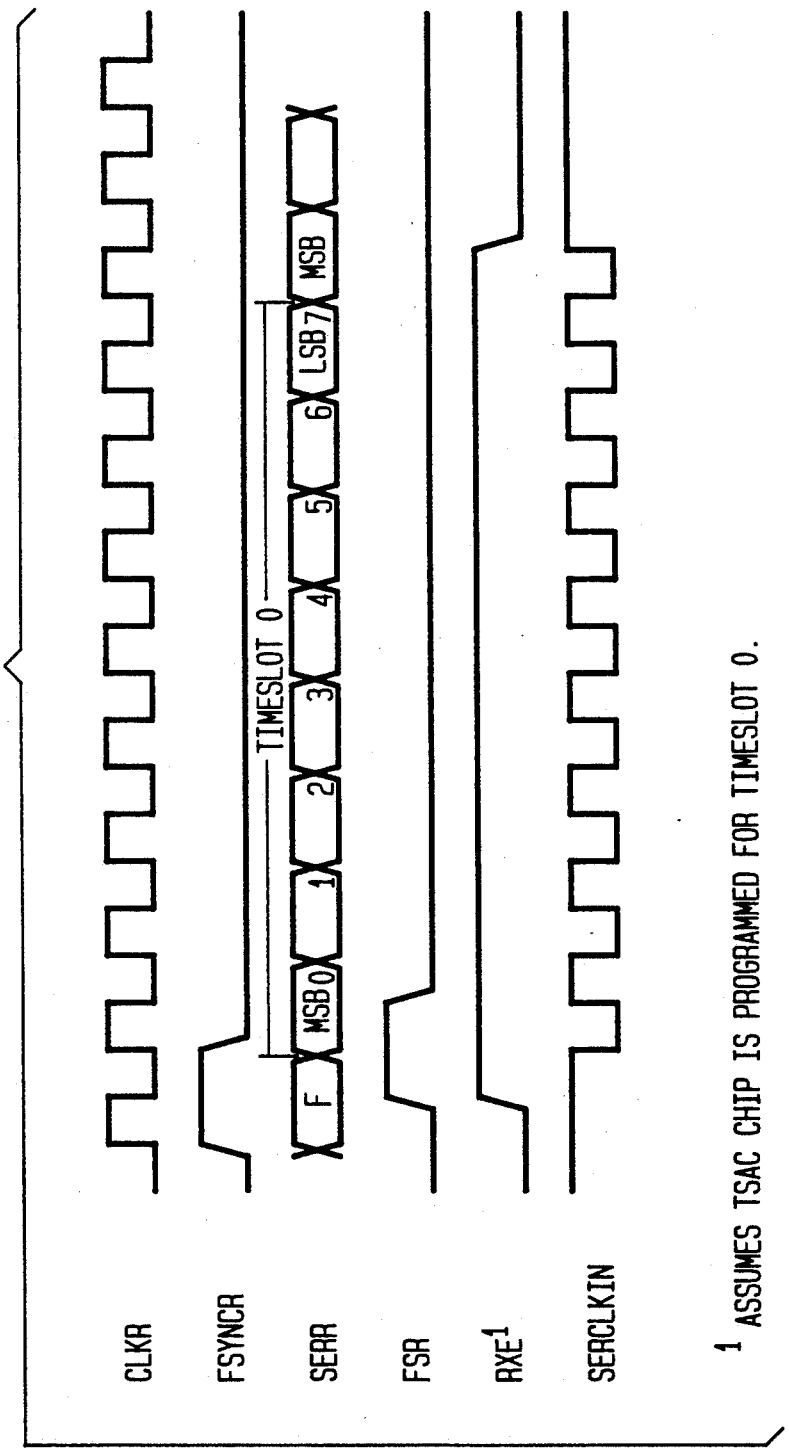
FIG. 14 shows the timing diagram for DS0 receiver 810 shown in FIG. 13.

FIG. 13 is a schematic of DS0 receiver 810 and FIG. 14 shows the timing diagram for the receiver. MC14417 TSAC chip 851 utilizes FSR to align the first bit of timeslot zero and FSYNCR is clocked over to generate FSR with the correct timing. TSAC chip 851 generates RXE on the timeslot programmed from the host computer. RXE is used to gate the receive clock to generate SERCLKIN. Clock SERCLKIN is used to clock the serial received data, i.e, SERR, into Rx FIFO 816 which is embodied in MMI67417. RXHF, i.e., the half-full signal, is used to generate an interrupt to the host computer. Parallel data can be read from Rx FIFO 816 via PC DATA BUS 852. PC DATA BUS transceiver 850 (74LS245) is normally in the B→A direction and allows bidirectional data transfers to and from the host.

Figure 15:
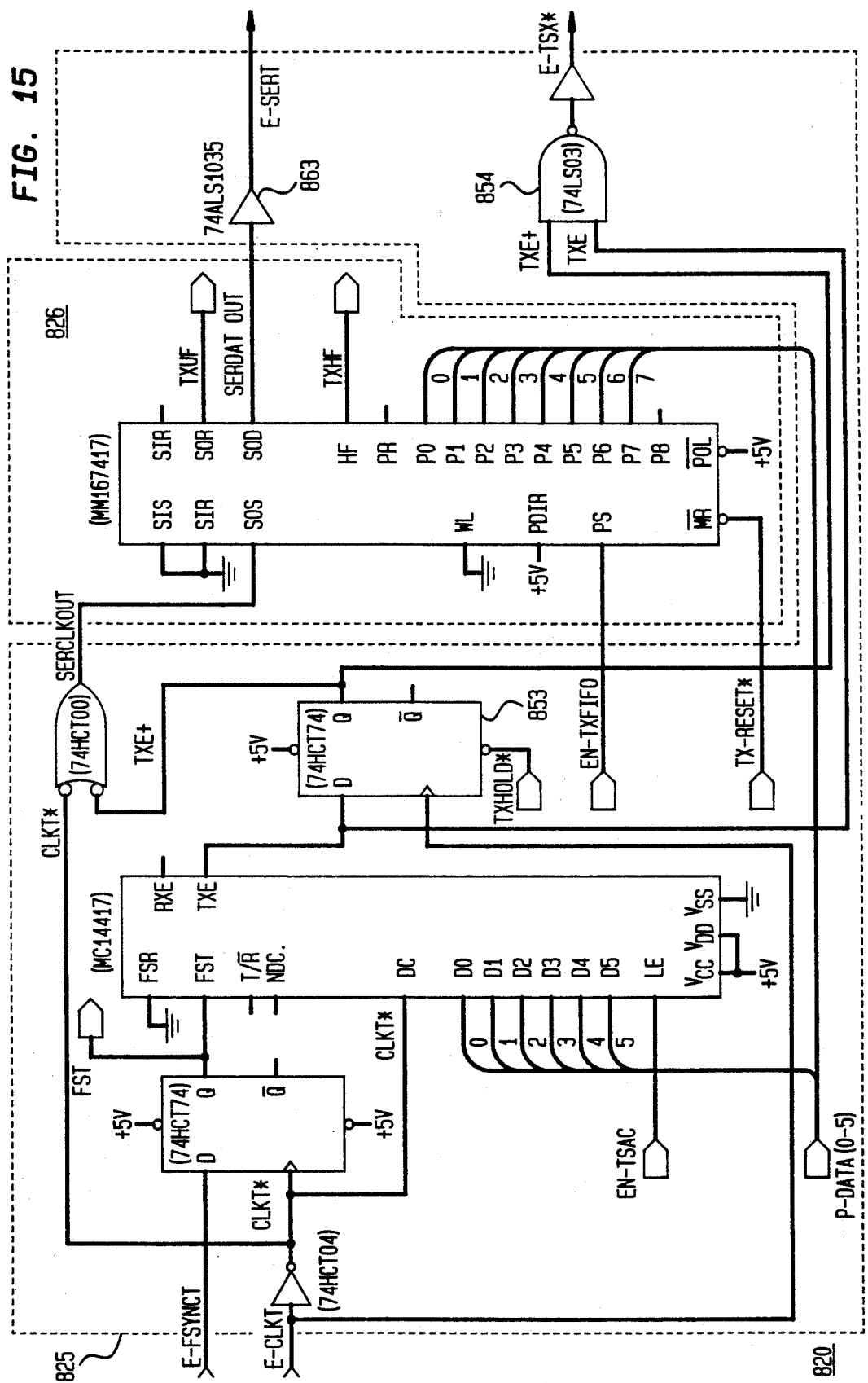
FIG. 15 is a schematic of DS0 transmitter 820 shown in FIG. 12.
Figure 16:
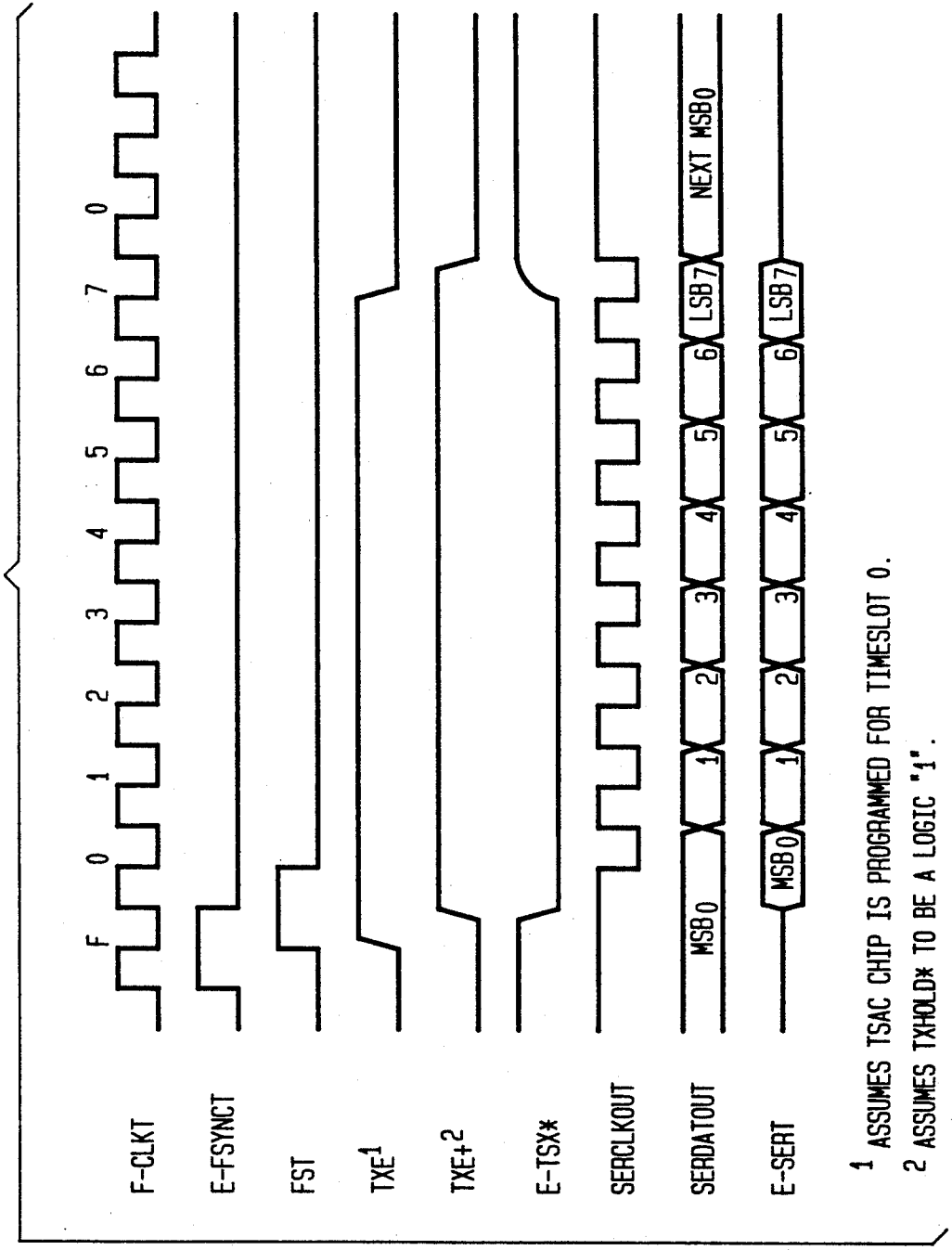
FIG. 16 shows the timing diagram for DS transmitter 820 shown in FIG. 15.

FIG. 15 is a schematic of DS0 transmitter 820 and FIG. 16 shows the timing diagram for the transmitter. This circuit is similar to the receiver for generating TSAC timing, however, the output timing is slightly different because flip-flop 853, 74HCT74, and open-collector NAND gate 854, 74LS03, are required. As to initial conditions, after Tx-RESET* is removed, signal TxHOLD* will not allow serial data to be transmitted until Tx FIFO 826 has been loaded to half-full. Also, if Tx FIFO 826 overflows, TxHOLD* will be asserted until it is reloaded to half-full. While TxHOLD* is asserted, MARKS are transmitted to E-SERT. This ensures that a continuous stream of byte aligned data is output from the transmitter. This is important for voice and synchronous data applications.

Figure 17:
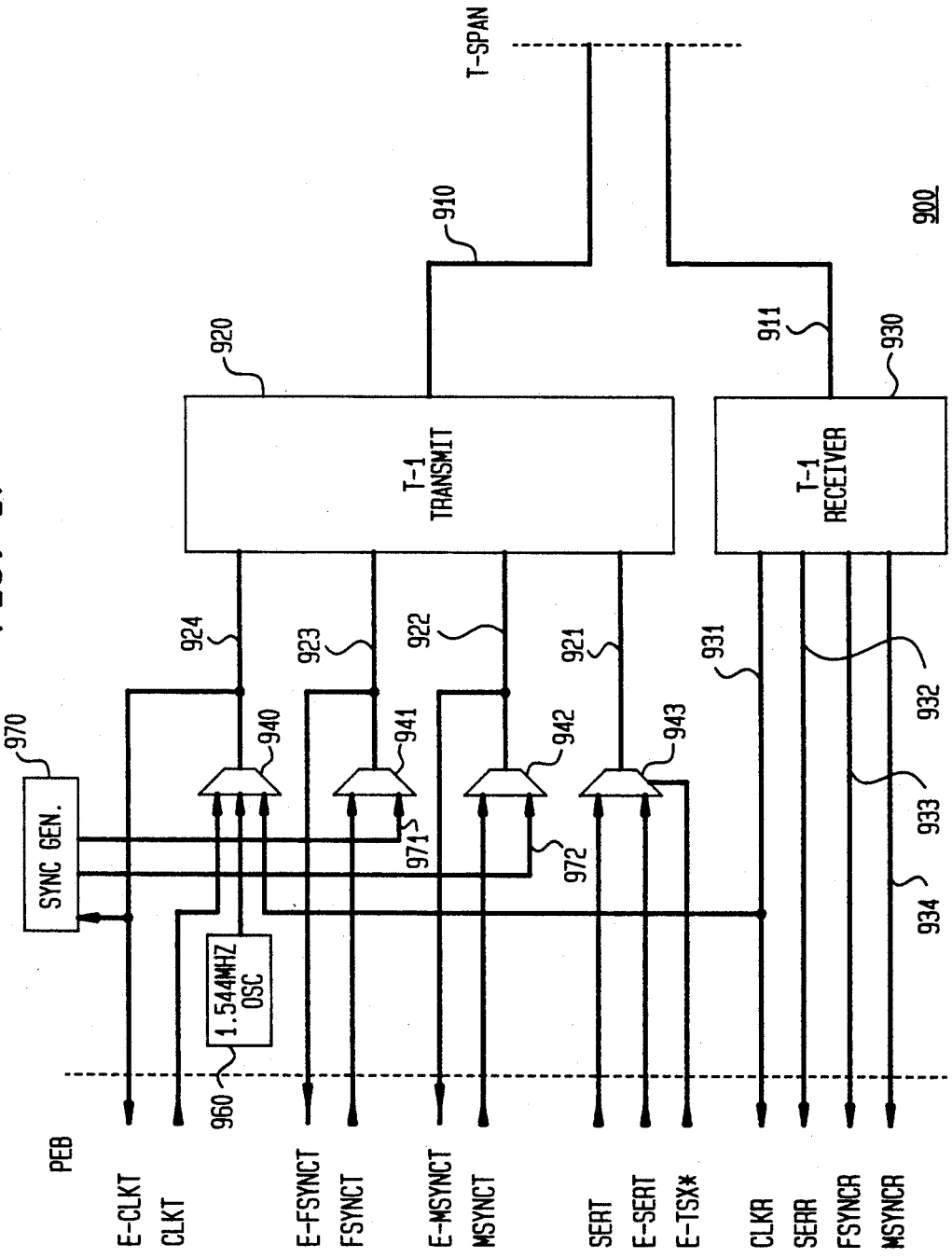
FIG. 17 shows a block diagram of one embodiment of a network module which interfaces with a TDM signal.

FIG. 17 shows a block diagram of network module 900 which interfaces with a TDM signal. A T1 signal from a T-Span is split into T1 transmit signal 910 and T1 receive signal 911 in a manner which is well known to those of ordinary skill in the art. T1 transmit signal 910 is output by T-1 transmitter 920 and T1 receive signal 920 is applied as input to T1 receiver 930. As shown in FIG. 17, T1 transmitter 920 receives: (a) T1 rate PCM data over lead 921; (b) synchronization and framing data over leads 922 and 923; and (c) a clock signal over lead 924. T1 transmitter 920 combines these signals and encodes them into a T1 format in a manner which is well known to those of ordinary skill in the art. Further, as also shown in FIG. 17, in a manner which is well known to those of ordinary skill in the art, T1 receiver 930 derives: (a) the T1 clock from receive signal 911 and applies it as output over lead 931; (b) T1 rate PCM data from receive signal 911 and applies it as output over lead 932; and (c) synchronization and framing from receive signal 911 and applies them as output over lead 933 and 934.

As shown in FIG. 17, the PEB signals which have been described above are routed as follows in network module 900. CLKR, SERR, FSYNCR, and MSYNCR signals are driven by network module 900 onto the appropriate ones of the wires of the appropriate ribbon cable, i.e, straight or crossed, as has been described above. In addition, CLKR signal is also applied as input to multiplexer 940. Multiplexer 940 is multiplex apparatus which is well known to those of ordinary skill in the art which outputs one of several inputs. For example, multiplexer 940 has, as inputs, CLKR which was derived from T1 receive signal 911, CLKT which was applied as input from the PEB, and the output from local 1.544 MHz clock 960. The output from multiplexer 940 is the clock signal which is applied as input to T1 transmitter 920 to provide T1 transmit signal 910. In addition, as shown in FIG. 17, the output from multiplexer 940 drives PEB signal E-CLKT which is received by resource modules and synchronization generator 970. Synchronization generator 970 is local apparatus, i.e., local to network module 900, which is well known to those of ordinary skill in the art for generating synchronization and framing signals locally. Multiplexer 940 is set, in a manner which is well known to those of ordinary skill in the art, in accordance with a predetermined option, for determining the particular transmit clock signal which is applied over lead 924 as input to T1 transmitter 920.

As shown in FIG. 17, synchronization and framing signals which are applied as input to T1 transmitter 920 over leads 922 and 923 are output from multiplexers 941 and 942. The inputs to multiplexer 941 are PEB signal FSYNCT and a signal over lead 971 from local synchronization generator 970. The output from multiplexer 941 also drives PEB signal E-FSYNCT which is received by resource modules. The inputs to multiplexer 942 are PEB signal MSYNCT and a signal over lead 972 from local synchronization generator 970. The output from multiplexer 942 also drives PEB signal E-MSYNCT which is received by resource modules. Multiplexers 941 and 942 are set, in a manner which is well known to those of ordinary skill in the art, in accordance with a predetermined option, for determining the particular synchronization and framing signals which are applied over leads 922 and 923 as input to T1 transmitter 920.

As shown in FIG. 17, T1 data signals which are applied as input to T1 transmitter 920 over lead 921 are output from multiplexer 943. The inputs to multiplexer 943 are PEB signal SERT, PEB signal E-SERT, and PEB signal E-TSX*. As shown in FIG. 17, SERT is output from multiplexer 943 unless E-TSX* is asserted.

IF E-TSX* is asserted, then multiplexer 943 outputs E-SERT over lead 921.

Figure 18:
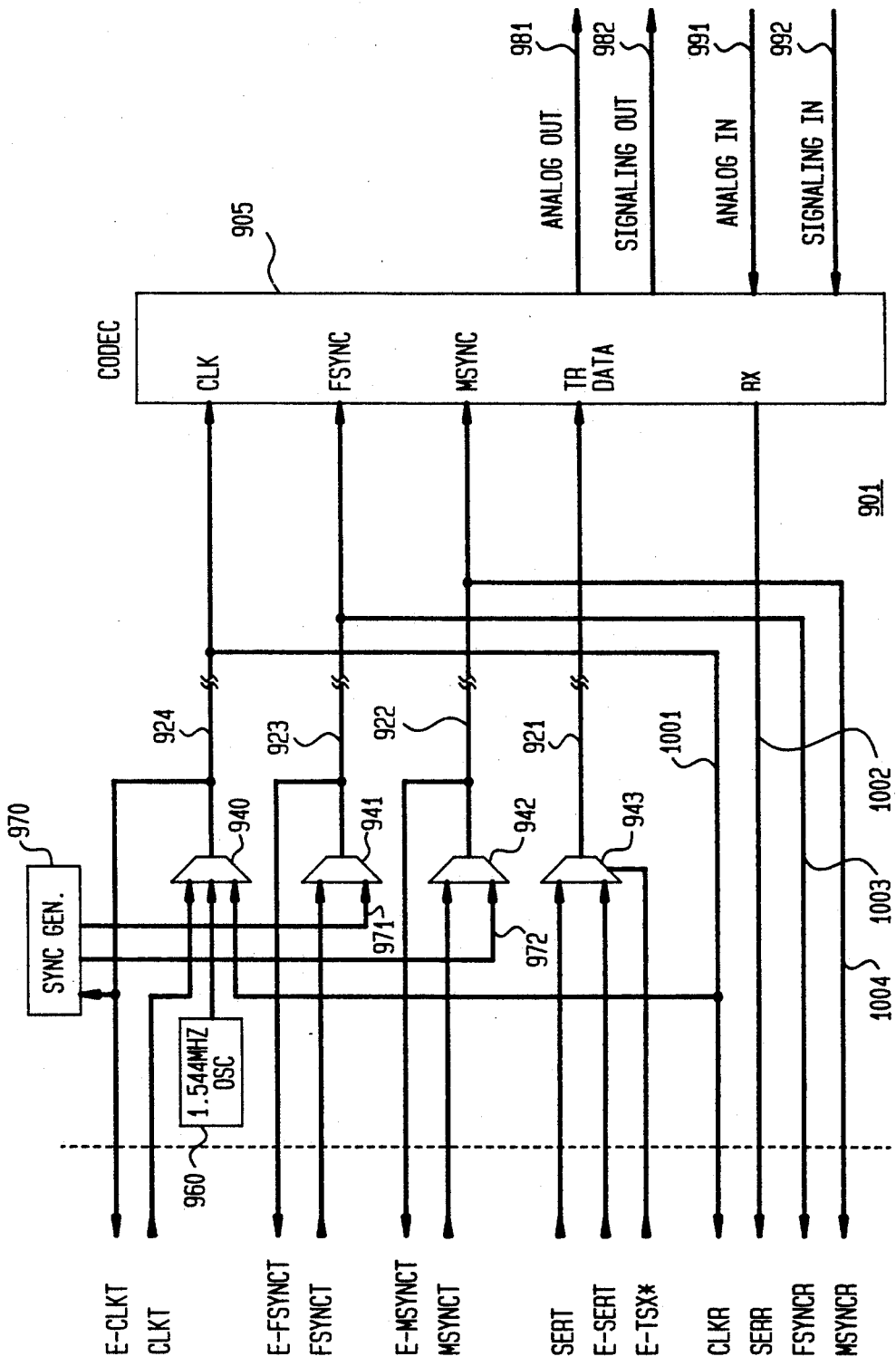
FIG. 18 shows a block diagram of a network module which interfaces with analog signals.

FIG. 18 shows a block diagram of a network module 901 which interfaces with analog signals. Major portions of network module 901 are the same as network module 900. The main difference occurs as a result of the fact that network module 901 interfaces with analog signals whereas network module 900 interfaces with TDM signals. In particular, as shown in FIG. 18, a clock signal is applied over lead 924 to CODEC 905, synchronization signals are applied over leads 922 and 923, respectively, to CODEC 905, and a data signal is applied over lead 921 to CODEC 905. The clock signal, the synchronization and framing signals, and data signals were described above with respect to network module 900. CODEC 905 comprises apparatus which is well known to those of ordinary skill in the art for converting these signals into various output analog signals 981 and various output analog signaling signals 982.

In addition, as is further shown in FIG. 18, analog input signals 991 and input analog signaling signals 992 are applied as input to CODEC 905. CODEC 905 also comprises apparatus which is well known to those of ordinary skill in the art for converting input analog signals and input analog signaling signals into a logical, multiplexed data signal which is applied as output over lead 1002. This signal is applied to the PEB as SERR.

Lastly, as shown in FIG. 18: a signal which is applied to the PEB as CLKR over lead 1001 is obtained as the clock signal output over lead 924 and the signals which are applied to the PEB as FSYNCR and MSYNCR over leads 1003 and 1004, respectively, are obtained as the synchronization and framing signals output over leads 923 and 922, respectively. As one can readily appreciate, network module 901 permits far-end network modules and resource modules to interact with a multiplicity of analog signals or with various channels in a TDM signal in a common manner.

Those skilled in the art recognize that further embodiments of the present invention may be made without departing from its teachings.

What is claimed is:

1. Network module apparatus for receiving an input series time division multiplexed (TDM) digital signal and for transmitting information contained therein onto a bus and for receiving information from the bus and generating an output serial TDM signal, which apparatus comprises:

means, responsive to the input TDM signal, for generating a receive clock signal (CLKR) having a clock rate which is substantially equal to a data information clock rate of the input serial TDM signal and for driving the receive clock signal on a receive clock pathway on the bus;

means, responsive to the input TDM signal, for generating a serial receive data signal (SERR) and for driving the receive data signal on a receive data pathway on the bus;

means, responsive to the input TDM signal, for generating receive synchronization and framing signals (FSYNCR and MSYNCR) and for driving the receive synchronization and framing signals on receive synchronization and framing pathways on the bus; and means, responsive to: (a) a transmit clock signal (CLKT) applied thereto over a transmit clock pathway on the bus, (b) transmit synchronization and framing signals (FSYNCT and MSYNCT) applied thereto over transmit synchronization and framing pathways on the bus, and (c) a serial transmit data signal (SERT) applied thereto over a transmit data pathway on the bus, for generating the output TDM signal.

2. The network module apparatus of claim 1 which further comprises:

means, responsive to a resource transmit data signal (E-SERT) applied thereto over a resource transmit data pathway on the bus and to a transmit slot selected signal (E-TSX*) applied thereto over a transmit slot select pathway on the bus, for replacing a portion of the transmit data signal (SERT) with the resource transmit data signal whenever the transmit slot select signal is asserted.

3. The network module apparatus of claim 1 which further comprises:

means, responsive to the transmit clock signal (CLKT), for generating a resource transmit clock signal (E-CLKT) and for driving the resource transmit clock signal on a resource transmit clock pathway on the bus; and means, responsive to the transmit synchronization and framing signals (FSYNCT and MSYNCT), for generating resource transmit synchronization and framing signals (E-FSYNCT and E-MSYNCT) and for driving the resource transmit synchronization and framing signals on resource transmit synchronization and framing pathways on the bus.

4. The network module apparatus of claim 3 wherein the means for generating a resource transmit clock signal (E-CLKT) is further responsive to the receive data clock signal (CLKR).

5. The network module apparatus of claim 3 wherein the means for generating a resource transmit clock signal (E-CLKT) is further responsive to a local clock.

6. The network module apparatus of claim 3 wherein the means for generating resource transmit synchronization and framing signals (E-FSYNCT and E-MSYNCT) is further responsive to a signal from a local synchronization generator which local synchronization generator is responsive, in turn, to the resource transmit clock signal (E-CLKT).

7. The network module apparatus of claim 1 wherein predetermined ones of the receive synchronization and framing signals (FSYNCR and MSYNCR) have predetermined signal values whenever the input TDM signal loses synchronization.

8. The network module apparatus of claim 1 which further comprises resource module apparatus, which resource module apparatus comprises means: (a) for receiving the serial receive data signal (SERR) from the receive data pathway on the bus; (b) for receiving the receive clock signal (CLKR) from the receive clock pathway on the bus; (c) for receiving the receive synchronization and framing signals (FSYNCR and MSYNCR) from the receive synchronization and framing pathways on the bus; and, in response thereto, (d) for selecting predetermined portions of the receive data signal.

9. The network module apparatus of claim 3 which further comprises resource module apparatus, which resource module apparatus comprises means: (a) for receiving the resource transmit clock signal (E-CLKT) from the resource transmit clock pathway on the bus; (b) for receiving the resource transmit synchronization and framing signals (E-FSYNCT and E-MSYNCT)

from the resource transmit and framing pathways on the bus; and, in response thereto, (c) generating a resource transmit data signal (E-SERT) and for driving the resource transmit data signal on a resource transmit data pathway on the bus; and (d) for generating a transmit slot select signal (E-TSX*) and for driving the transmit slot select signal on a transmit slot select pathway on the bus.

10. The network module apparatus of claim 9 which further comprises:
    means, responsive to a resource transmit data signal (E-SERT) applied thereto over a resource transmit data pathway on the bus and to a transmit slot selected signal (E-TSX*) applied thereto over a transmit slot select pathway on the bus, for replacing a portion of the transmit data signal (SERT) with the resource transmit data signal whenever the transmit slot select signal is asserted.

11. Network module apparatus for receiving at least one input analog signal and at least one input analog signaling signal and for transmitting information contained therein onto a bus and for receiving information from the bus and generating at least one output analog signal and at least one output analog signaling signal, which apparatus comprises:
    means, responsive to the at least one input analog signal and to the at least one input analog signaling signal, for generating a serial receive data signal (SERR) and for driving the receive data signal on a receive data pathway on the bus;
    means for generating a receive clock signal (CLKR) having a clock rate which is substantially equal to a data information clock rate of the receive data signal and for driving the receive clock signal on a receive clock pathway on the bus;
    means for generating receive synchronization and framing signals (FSYNR and MSYNCR) and for driving the receive synchronization and framing signals on receive synchronization and framing pathways on the bus; and
    means, responsive to: (a) a transmit clock signal (CLKT) applied thereto over a transmit clock pathway on the bus, (b) transmit synchronization and framing signals (FSYNCT and MSYNCT) applied thereto over transmit synchronization and framing pathways on the bus, and (c) a transmit data signal (SERT) applied thereto over a transmit data pathway on the bus, for generating the at least one output analog signal and the at least one output analog signaling signal.

12. The network module apparatus of claim 11 which further comprises:
    means, responsive to a resource transmit data signal (E-SERT) applied thereto over a resource transmit data pathway on the bus and to a transmit slot selected signal (E-TSX*) applied thereto over a transmit slot select pathway on the bus, for replacing a portion of the transmit data signal (SERT) with the resource transmit data signal whenever the transmit slot select signal is asserted.

13. The network module apparatus of claim 11 which further comprises:
    means, responsive to the transmit clock signal (CLKT), for generating a resource transmit clock signal (E-CLKT) and for driving the resource transmit clock signal on a resource transmit clock pathway on the bus;
    means, responsive to the transmit synchronization and framing signals (FSYNCT and MSYNCT), for generating resource transmit synchronization and framing signals (E-FSYNCT and E-MSYNCT) and for driving the resource transmit synchronization and framing signals on resource transmit synchronization and framing pathways on the bus.

14. The network module apparatus of claim 11 wherein the transmit clock signal (CKLT) applied as input over the transmit clock pathway is utilized to provide the receive clock signal (CKLR); and
    the transmit synchronization and framing signals (FSYNCT and MSYNCT) applied as input over the transmit synchronization and framing pathways are utilized to provide the receive synchronization and framing signals.

15. The network module apparatus of claim 11 which further comprises resource module apparatus, which resource module apparatus comprises means: (a) for receiving the serial receive data signal (SERR) from a receive data pathway on the bus; (b) for receiving the receive clock signal (CLKR) from the receive clock pathway on the bus; (c) for receiving the receive synchronization and framing signals (FSYNCR and MSYNCR) from the receive synchronization and framing pathways on the bus; and, in response thereto, (d) for selecting predetermined portions of the receive data signal.

16. The network module apparatus of claim 15 which further comprises resource module apparatus, which resource module apparatus comprises means: (a) for receiving the resource transmit clock signal (E-CLKT) from the resource transmit clock pathway on the bus; (b) for receiving the resource transmit synchronization and framing signals (E-FSYNCT and E-MSYNCT) from the resource transmit and framing pathways on the bus; and, in response thereto, (c) for generating a resource transmit data signal (E-SERT) and for driving the resource transmit data signal on a resource transmit data pathway on the bus; and (d) for generating a transmit slot select signal (E-TSX*) and for driving the transmit slot select signal on a transmit slot select pathway on the bus.

17. The network module apparatus of claim 16 which further comprises:
    means, responsive to a resource transmit data signal (E-SERT) applied thereto over a resource transmit data pathway on the bus and to a transmit slot selected signal (E-TSX*) applied thereto over a transmit slot select pathway on the bus, for replacing a portion of the transmit data signal (SERT) with the resource transmit data signal whenever the transmit slot select signal is asserted.

* * * * *